US008593753B1

(12) United States Patent
Anderson

(10) Patent No.: US 8,593,753 B1
(45) Date of Patent: Nov. 26, 2013

(54) TOUCHDOWN DETECTION

(75) Inventor: Kent D. Anderson, Broomfield, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 884 days.

(21) Appl. No.: 12/765,800

(22) Filed: Apr. 22, 2010

(51) Int. Cl.
*G11B 5/60* (2006.01)
*G11B 21/21* (2006.01)

(52) U.S. Cl.
USPC .......................................... 360/75

(58) Field of Classification Search
None
See application file for complete search history.

(56) References Cited

U.S. PATENT DOCUMENTS

| 5,450,747 | A | 9/1995 | Flechsig et al. |
| 5,594,595 | A | 1/1997 | Zhu |
| 5,742,446 | A | 4/1998 | Tian et al. |
| 5,831,781 | A | 11/1998 | Okamura |
| 5,880,587 | A | 3/1999 | Annis et al. |
| 6,008,640 | A | 12/1999 | Tan et al. |
| 6,097,559 | A | 8/2000 | Ottesen et al. |
| 6,105,432 | A | 8/2000 | Taniguchi et al. |
| 6,196,062 | B1 | 3/2001 | Wright et al. |
| 6,226,140 | B1 | 5/2001 | Serrano et al. |
| 6,671,110 | B2 | 12/2003 | Baba et al. |
| 6,683,737 | B2 | 1/2004 | Gong et al. |
| 7,046,463 | B2 | 5/2006 | Gay Sam et al. |
| 7,095,578 | B2 | 8/2006 | Ma |
| 7,158,325 | B1 | 1/2007 | Hu et al. |
| 7,336,434 | B2 * | 2/2008 | Lille et al. ........................ 360/75 |
| 7,518,813 | B1 | 4/2009 | Egan et al. |
| 7,522,369 | B1 * | 4/2009 | Rahgozar et al. ............... 360/75 |
| 7,657,826 | B2 * | 2/2010 | Imamura et al. .............. 714/799 |
| 7,796,356 | B1 * | 9/2010 | Fowler et al. ................... 360/75 |
| 7,800,858 | B1 * | 9/2010 | Bajikar et al. .................. 360/75 |
| 8,009,380 | B2 * | 8/2011 | Matsushita et al. ............. 360/75 |
| 8,098,450 | B2 * | 1/2012 | Baumgart et al. .............. 360/75 |
| 8,139,310 | B1 * | 3/2012 | Hogg .............................. 360/75 |
| 8,279,550 | B1 * | 10/2012 | Hogg .............................. 360/75 |
| 2003/0002183 | A1 | 1/2003 | Fioravanti |
| 2005/0185312 | A1 | 8/2005 | Ueda et al. |
| 2008/0123511 | A1 | 5/2008 | Takahashi |
| 2008/0137225 | A1 | 6/2008 | Duan et al. |

\* cited by examiner

*Primary Examiner* — Hoa T Nguyen
*Assistant Examiner* — James L Habermehl

(57) ABSTRACT

Systems and methods for detecting touchdown of a head on a disk are provided. In one embodiment, a disk drive comprises a thermal sensor configured to sense a temperature of a head and to generate a thermal signal based on the sensed temperature. The disk drive also comprises touchdown circuit configured to receive the thermal signal, to increment a count value each time the thermal signal exceeds a thermal threshold, and to output a fault signal when the count value is equal to or exceeds a count threshold.

21 Claims, 9 Drawing Sheets

TOUCHDOWN DETECTION

BACKGROUND

A disk drive comprises a rotating disk and a head over the disk to magnetically write to and read data from the disk. The head may be connected to a distal end of an actuator arm that is rotated about a pivot to position the head radially over the disk. During write/read operations, the head flies above the disk surface on a cushion of air formed by the rotating disk. The fly height of the head may be adjusted by a dynamic fly height (DFH) heater or other mechanism. When the head touches down on the rotating disk, the head and/or disk may be damaged. Therefore, it is desirable to detect touchdown of the head on the disk and to stop the detected touchdown to prevent damage to the head and/or disk.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
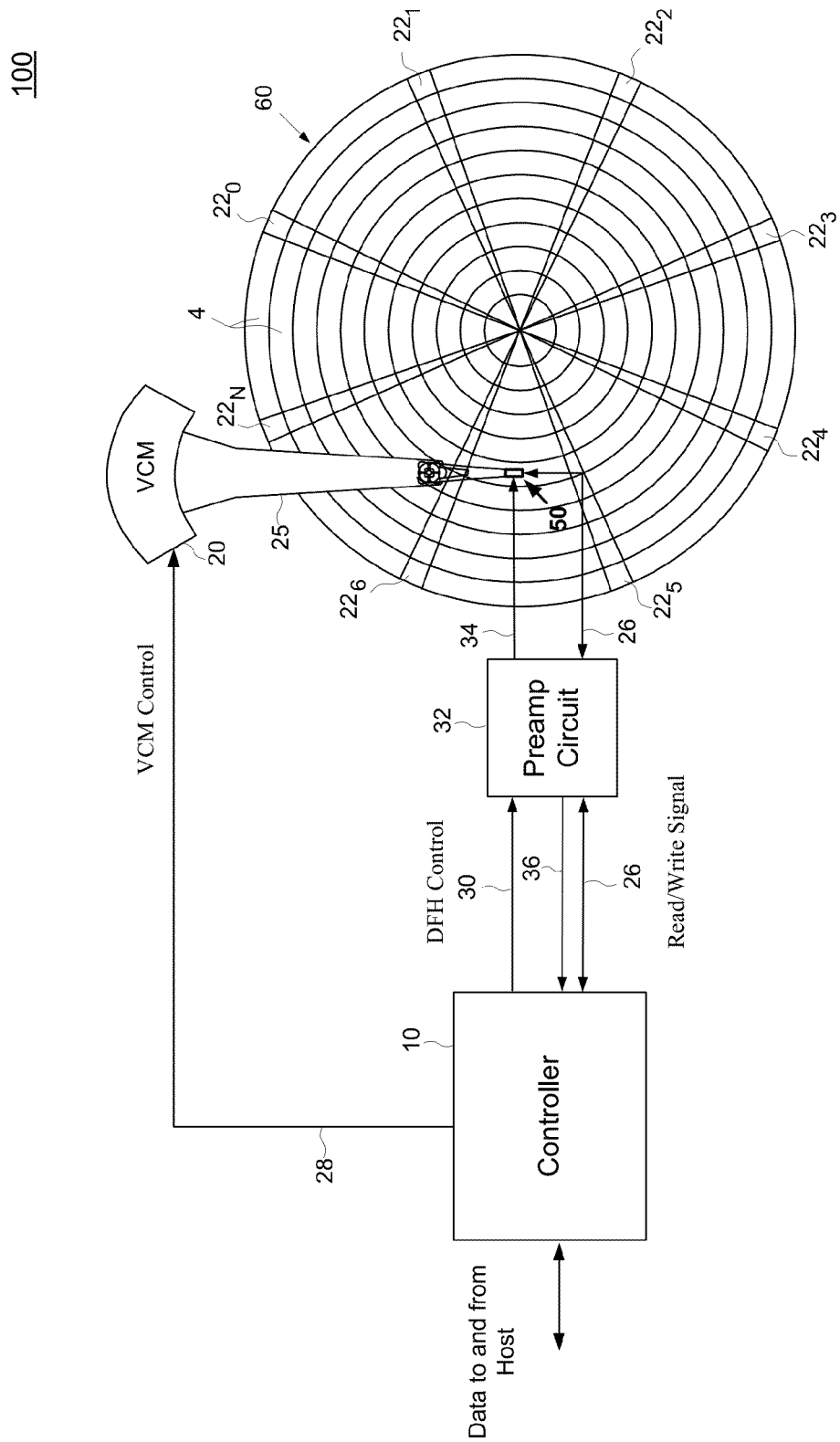
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk 60 comprises a number of concentric data tracks 4, each of which may be partitioned into a number of data sectors (not shown). The disk 60 may also comprise a plurality of embedded servo sectors $22_0$-$22_N$, each of which may include position information that can be read from the disk 60 by the head 50 to determine the position of the head 50 over the disk 60.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuit and/or a combination thereof. The controller 10 may be located on a printed circuit board (PCB).

The controller 10 uses the head 50 to magnetically write data to and read data from the disk 60. To write data to the disk 60, the controller 10 processes the data into a write signal 26 and outputs the write signal 26 to the head 50. The head 50 converts the write signal into a magnetic field that magnetizes the disk 60 based on the write signal, thereby writing the data to the disk 60. To read data from the disk 60, the head 50 generates a read signal based on the magnetization of the disk 60 and outputs the read signal 26 to the controller 10. The controller 10 processes the read signal 26 into data. The controller 10 may write data to and read data from the disk 60 in respond to commands from a host device.

The disk drive 100 may also comprise a preamplifier circuit 32 for shaping and driving the write signal 26 to the head 50 and amplifying the read signal 26 from the head 50. The preamplifier circuit 32 may be located on the actuator arm 25, the VCM 20 or other location between the head 50 and the controller 10. The preamplifier circuit 32 may also be integrated in the controller 10.

The preamplifier circuit 32 may communicate a fault condition in the preamplifier circuit 32 to the controller 10 through a line 36 connected to a fault pin at the preamplifier circuit 32. The fault condition may include an open and/or short circuit in the head 50 or other abnormality. Upon receiving a fault signal from the preamplifier circuit 32, the controller 10 may interrogate the preamplifier 32 through an interface to determine the nature of the fault.

The disk drive 100 may also comprise a dynamic fly height (DFH) system (not shown) for adjusting the fly height of the head 50 above the disk 60. The DFH system may comprise a heater that controls the fly height through thermal expansion. The controller 10 may control the fly height by sending a DFH control signal 30 to the preamplifier circuit 32 to adjust the current 34 to the heater.

Figure 2:
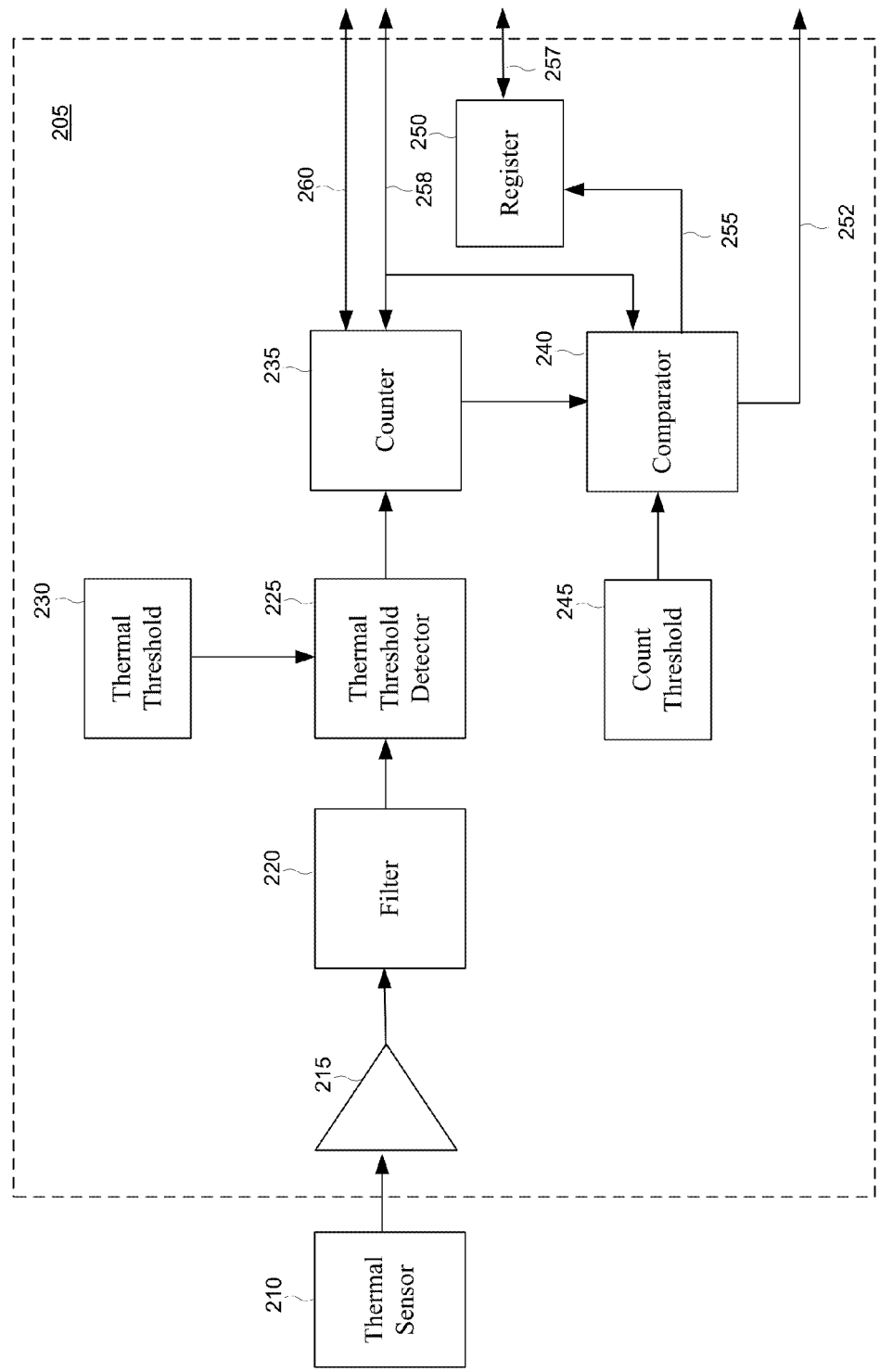
FIG. 2 is a block diagram of a touchdown circuit according to an embodiment of the present invention.

FIG. 2 shows a touchdown circuit 205 according to an embodiment of the present invention. The touchdown circuit 205 detects touchdown of the head 50 on the disk 60 by detecting changes in the temperature of the head 50 that are indicative of touchdown. The touchdown circuit 205 may be included in the preamplifier circuit 32, as discussed further below.

The touchdown circuit 205 receives a thermal signal from a thermal sensor 210 that is configured to sense a temperature of the head 50. The thermal sensor 210 may comprise a thermister, a tunnel magneto resistive (TMR) sensor, a giant magneto resistive (GMR) sensor, or other type of sensor capable of sensing temperature. The thermal sensor 210 may be located at or proximate to the head 50 to sense the temperature of the head 50. For example, the thermal sensor 210 may be embedded in the head 50.

The touchdown circuit 205 comprises an amplifier 215, a filter 220, a thermal threshold detector 225, a counter 235 and a comparator 240. The amplifier 215 is configured to amplify the thermal signal from the thermal sensor 210.

The filter 220 is configured to pass a portion of the thermal signal due to touchdown of the head 50 on the disk 60 and filter out other portions of the thermal signal due to background noise, ambient temperature, temperature of the DFH heater, and/or other unwanted sources. For example, touchdown of the head 50 on the disk 60 may cause the thermal signal to oscillate at one or more resonant frequencies of an air bearing surface of the head 50 and/or the disk 60. In this example, the filter 220 may comprise a bandpass filter that passes the thermal signal within a frequency bandpass corresponding to the air bearing surface resonance. The air bearing surface resonance may be depend on the rotational speed of disk 60, head geometry, stiffness of the head suspension, roughness of the disk surface and/or other factors. In this example, the bandpass of the bandpass filter may be selected to isolate the resonant frequencies from background noise, thereby improving the detection signal-to-noise ratio (SNR).

Figure 3:
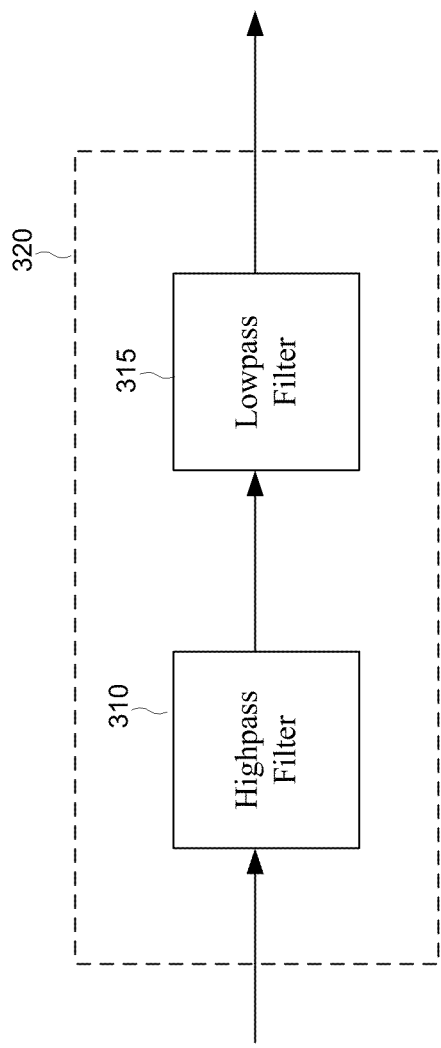
FIG. 3 is a block diagram of a bandpass filter according to an embodiment of the present invention.

FIG. 3 shows an example of a bandpass filter 320 that may be used for the filter 220. In this example, the bandpass filter 320 is implemented using a combination of a highpass filter 310 and a lowpass filter 315. The highpass filter 310 may be a one-pole highpass filter having a cutoff frequency of approximately 50-500 KHz, and the lowpass filter 315 may be a three-pole lowpass filter having a cutoff frequency of approximately 200-2000 KHz. It is to be appreciated that the transfer functions of the highpass filter 310 and the lowpass filter 315 may have any number of poles and/or zeros. In one embodiment, the bandpass filter 320 may have a bandpass within a frequency range of approximately 50 KHz to 2000 KHz, and more particularly 100 KHz to 600 KHz.

Referring back to FIG. 2, the thermal threshold detector 225 receives the filtered thermal signal from the filter 220 and a thermal threshold 230. In one embodiment, the thermal threshold detector 225 compares the filtered thermal signal with the thermal threshold 230 and outputs a pulse signal each time the filtered thermal signal exceeds the thermal threshold 230. The thermal threshold 230 may be outputted by a programmable digital-to-analog converter (DAC), which allows adjustment of the thermal threshold 230 by writing the thermal threshold to a register.

The counter 235 counts the number of pulses from the thermal threshold detector 225, and hence the number of times that the filtered thermal signal exceeds the thermal threshold. Thus, the count value of the counter 235 is incremented by one count each time the filtered thermal signal exceeds the thermal threshold.

The comparator 240 receives the count value from the counter 235 and a count threshold 245. The count threshold 245 may be adjusted by writing the count threshold to a register. The comparator 240 compares the count value with the count threshold 245 and outputs a fault signal 252 to the controller 10 when the count value is equal to or exceeds the count threshold 245. In one embodiment, the fault signal 252 indicates potential touchdown of the head 50 on the disk 60. In response to receiving the fault signal 252, the controller 10 determines whether touchdown has actually occurred, as discussed below.

The controller 10 may determine whether there is touchdown by reading the count value from the counter 235 a time duration (e.g., 50 microseconds) after receiving the fault signal 252, and determining whether the read count value is above the count threshold 245 by a certain amount. The higher the read count value is above the count threshold 245, the greater the likelihood the fault signal 252 was triggered by touchdown of the head 50 on the disk 60 rather than spurious contact between the head 50 and the disk 60 and/or noise. This is because the count value increases at a much faster rate due to touchdown, as discussed further below. In this embodiment, the controller 10 may determine there is touchdown when the read count value is above the count threshold 245 by a certain amount (e.g., 5 counts) and may determine there is no touchdown when the read count value is not above the count threshold 245 by the certain amount.

In this embodiment, the counter 235 continues to count the number of pulses from the thermal threshold detector 225 after the fault signal 252 is sent to the controller 10. This allows the controller 10 to later read the count value from the counter 235 the time duration (e.g., 50 microseconds) after receiving the fault signal 252 and determine how much the count value has increased above the count threshold during that time. The controller 10 may read the count value from the counter 235 via line 260. After making a determination whether there is touchdown, the controller 10 may reset the counter 235 to zero to reset the touchdown circuit 205 to detect another touchdown. The counter 235 may also automatically reset when the controller 10 reads the count value from the counter 235.

In one embodiment, the comparator 240 may be a one-shot comparator that outputs the fault signal 252 one time when the count value from the counter 235 initially reaches the count threshold 245. After making a determination whether there is touchdown in response to the fault signal 252, the controller 10 may reset the one-shot comparator in addition to resetting the counter 235. The controller 10 may reset both the comparator 240 and the counter 235 by sending a reset signal 258 to the comparator 240 and the counter 235. Alternatively, the controller 10 may reset a control bit in a register 250 that causes the comparator 240 and the counter 235 to reset.

In one embodiment, when the count value is equal to or exceeds the count threshold 245, the comparator 240 may write a fault status message in a register 250 indicating that the fault signal 252 was triggered by potential touchdown. After receiving the fault signal 252, the controller 10 may read the fault status message from the register 250 via a communication line 257 to determine whether the fault signal 252 was triggered by potential touchdown. For example, the controller 10 may receive the fault signal 252 along with other fault signals triggered by other events, e.g., abnormalities in the preamp circuit 32, on a shared fault line. By reading the fault status message from the register 250, the controller 10 is able to indentify the nature of a received fault signal, and therefore distinguish the fault signal 252 from other fault signals received on the shared fault line.

In one embodiment, the counter 235 may be configured to saturate when the maximum count value of the counter 235 is reached. This way, the counter 235 does not wrap-around to zero when the maximum count value of the counter 235 is reached. In this embodiment, the controller 10 may reset the counter 235 after making a determination whether there is touchdown.

An example illustrating operation of the touchdown circuit 205 according to an embodiment will now be described with reference to FIGS. 4 to 6.

Figure 4:
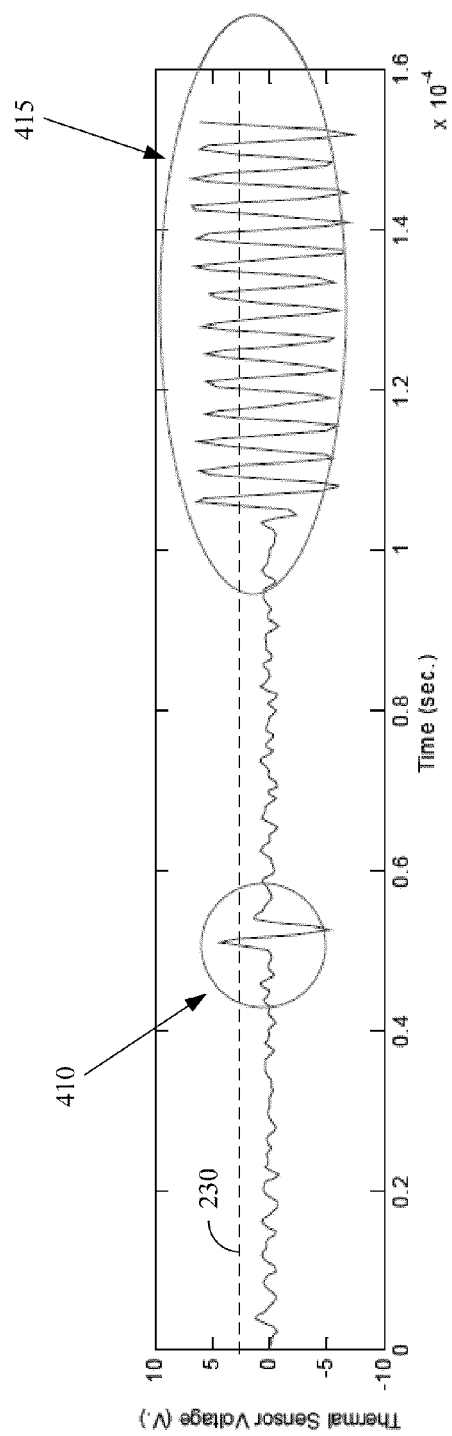
FIG. 4 shows an example of a filtered thermal signal plotted over time according to an embodiment of the present invention.

FIG. 4 shows an example of the filtered thermal signal plotted over time, in which the thermal signal has been bandpass filtered by the filter 220. In this example, the filtered thermal signal includes an isolated peak 410 due to spurious contact between the head 50 and the disk 60. The filtered thermal signal also includes a sequence of peaks 415 due to touchdown of the head 50 on the disk 60. For the example in which touchdown causes the thermal signal to oscillate at one or more resonant frequencies of the air bearing surface, the peaks 415 may occur at a rate corresponding to one of the resonant frequencies of the air bearing surface.

FIG. 4 also shows an example of a thermal threshold 230 that may be used by the thermal threshold detector 225. The thermal threshold 230 may be set to a level that allows the thermal threshold detector 225 to detect peaks 415 in the filtered thermal signal due to touchdown while minimizing false detections due to noise and/or other unwanted sources.

Figure 5:
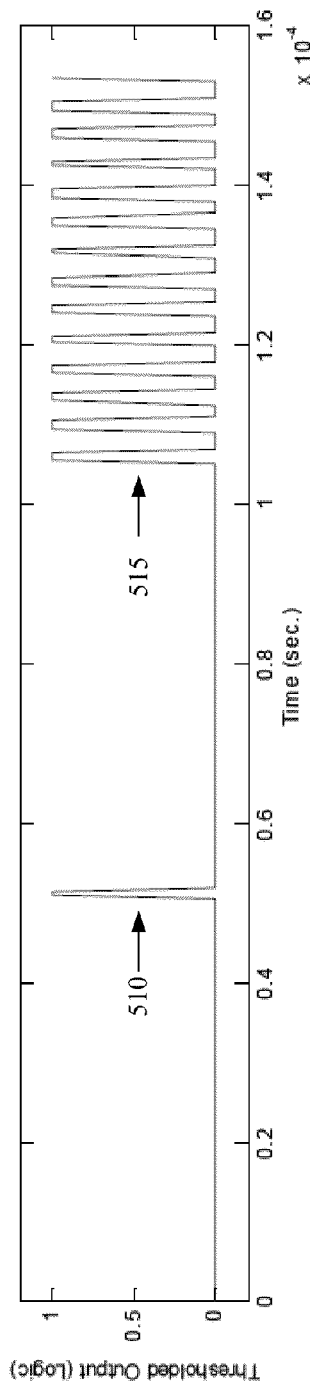
FIG. 5 shows an example of an output of a thermal threshold detector plotted over time according to an embodiment of the present invention.

FIG. 5 shows an example of the thermal threshold detector 225 output plotted over time, in which the filtered thermal signal and the thermal threshold shown in FIG. 4 are inputted to the thermal threshold detector 225. In this example, the thermal threshold detector 225 outputs a single pulse 510 corresponding to the isolated peak 410 due to spurious contact. The thermal threshold detector 225 also outputs a sequence of pulses 515 corresponding to the peaks 415 due to touchdown.

Figure 6:
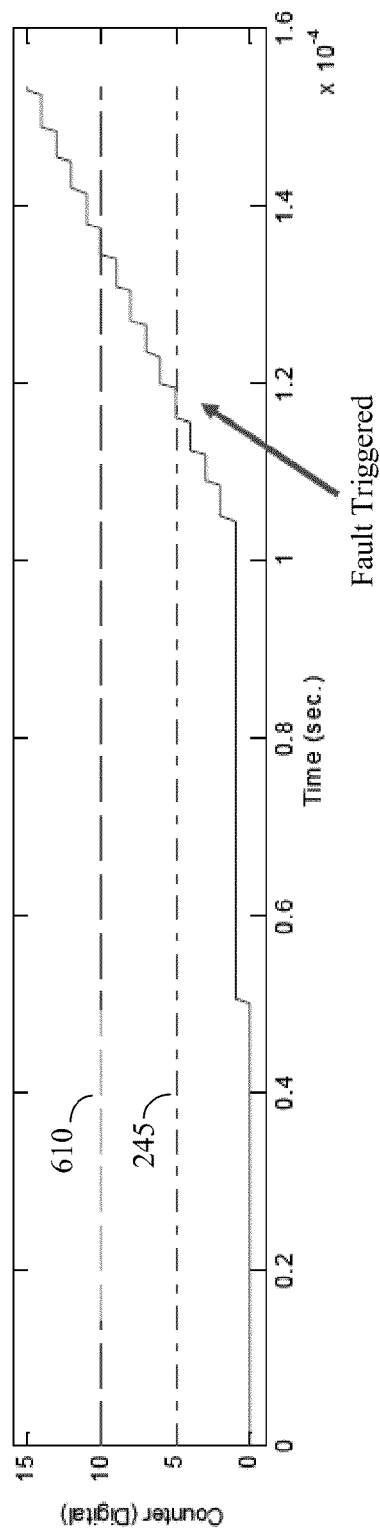
FIG. 6 shows an example of a count value plotted over time according to an embodiment of the present invention.

FIG. 6 shows an example of the count value of the counter 235 plotted over time resulting, in which the pulses shown in FIG. 5 are inputted to the counter 235. In this example, the counter 235 is initially set to zero. As shown in FIG. 6, the single pulse 510 corresponding to spurious contact causes the count value to increase by one count. The pulses 515 corresponding to touchdown cause the count value to quickly increase and reach the count threshold 245, at which point the fault signal 252 is triggered and sent to the controller 10. As shown in FIG. 6, the count value continues to increase due to the touchdown after the fault signal 252 is triggered.

A time duration after receiving the fault signal 252, the controller 10 may read the count value from the counter 235 to determine whether the read count value exceeds the count threshold 245 by a certain amount. The controller 10 may do this, for example, by determining whether the read count value is equal to or exceeds a controller threshold 610 that is set above the count threshold 245, as shown in FIG. 6. If the read count value is equal to or above the controller threshold 610, then the controller 10 may determine there is touchdown. Otherwise, the controller 10 may determine there is no touchdown.

The read count value allows the controller 10 to distinguish between a fault signal 252 triggered by touchdown of the head 50 on the disk 60 and a fault signal 252 triggered by the accumulation of many spurious contacts between the head 50 and the disk 60 over time. This is because the read count increases at a much faster rate, and is therefore more likely to equal or exceed the controller threshold 610, when the fault signal 252 is triggered by touchdown. In the example shown in FIG. 6, the count value reaches the controller threshold 610 about 20 microseconds after the fault signal 252 is triggered, indicating that the fault trigger 252 was likely triggered by touchdown. In this example, if the controller 10 reads the count value a time duration of 20 microseconds or more after receiving the fault signal 252, then the controller 10 determines there is touchdown.

Figure 7:
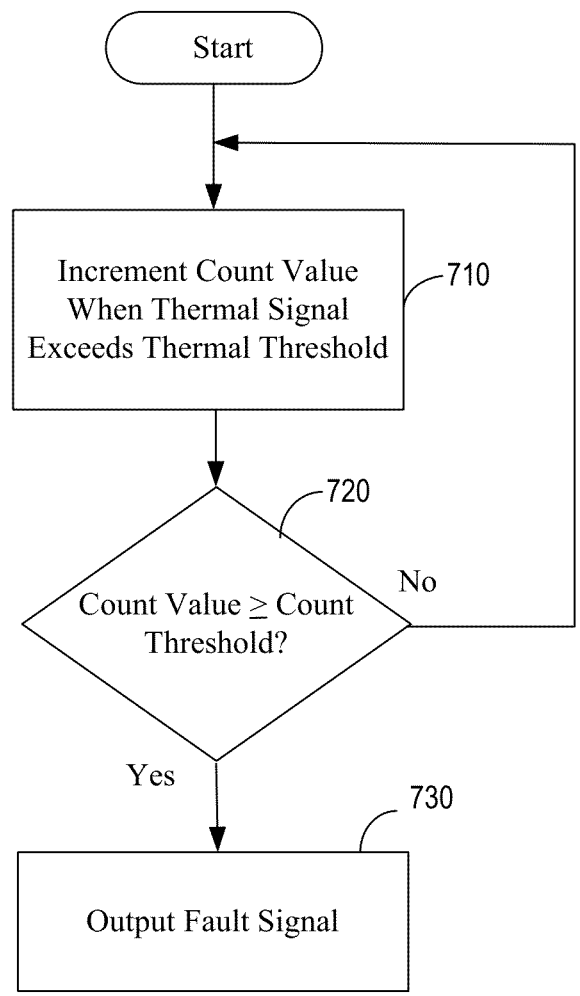
FIG. 7 is a flow diagram illustrating a method for triggering a fault signal according to an embodiment of the present invention.

FIG. 7 is a flow diagram illustrating a method for triggering a fault signal according to an embodiment. The method may be performed by the touchdown circuit 205.

In step 710, a count value is incremented when a thermal signal exceeds a thermal threshold. The thermal signal may be a based on a temperature of the head 50 sensed by the temperature sensor 210. Step 710 may be performed by the thermal threshold detector 225, which detects when the thermal signal exceeds the thermal threshold, and by the counter 235, which increments the count value when the thermal threshold detector 225 detects that the thermal signal exceeds the thermal threshold.

In step 720, a determination is made whether the count value is equal to or exceeds the count threshold. This step may be performed by the comparator 240. If the count value is equal to or exceeds the count threshold, then the method proceeds to step 730. Otherwise, the method returns to step 710.

In step 730, a fault signal is outputted. The fault signal may be outputted to the controller 10, which determines whether there is touchdown in response to receiving the fault signal.

Figure 8:
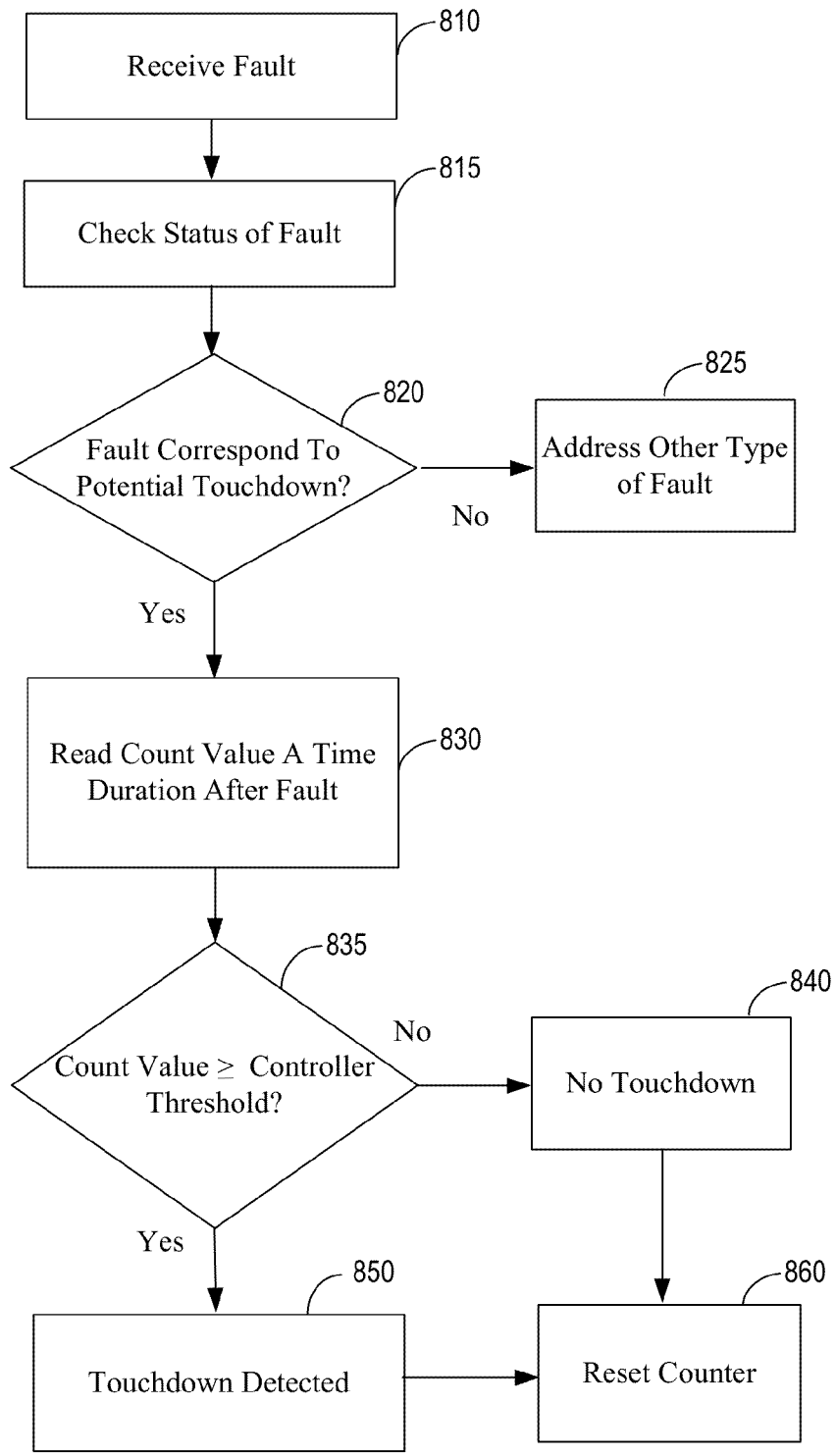
FIG. 8 is a flow diagram illustrating a method for determining whether there is touchdown in response to a fault signal according to an embodiment of the present invention.

FIG. 8 is a flow diagram illustrating a method for determining whether there is touchdown according to an embodiment. The method may be performed by the controller 10 in response to receiving a fault signal 252 from the touchdown circuit 205.

In step 810, a fault signal is received. For example, the controller 10 may receive the fault signal from the touchdown circuit 205. In step 815, a status of the fault is checked to identify the nature of the fault signal. For example, the controller 10 may read a fault status message from the register 250 to determine the nature of the fault signal. In step 820, a determination is made whether the fault signal received in step 810 was triggered by potential touchdown based on the status check in step 815. For example, the controller 10 may determine whether the fault signal corresponds to potential touchdown based on the fault status message read from the register 250. If the fault signal corresponds to potential touchdown, then the method proceeds to step 830. Otherwise, the method proceeds to step 825, in which another type of fault is addressed.

In step 830, the count value is read a time duration after the fault signal. For example, the controller 10 may read the count value from the counter 235, which continues to run after the fault signal. In step 835, a determination is made whether the read count value is equal to or exceeds a controller threshold. The controller threshold is set above the count threshold in step 720 of FIG. 7. If the read count value is equal to or exceeds the controller threshold, then touchdown is detected in step 850. Otherwise, no touchdown is detected in step 840. In both cases, the counter 235 is reset to detect another touchdown in step 860. When touchdown is detected in step 850, the controller 10 may take steps to stop the touchdown, for example, by increasing the fly height of the head 50.

The controller 10 may use other methods to determine whether there is touchdown. In one embodiment, the controller 10 may measure a time duration between the time the controller 10 receives the fault signal 252 and the time the controller 10 last reset the counter 235, and determine whether there is touchdown based on the length of the time duration. The shorter the time duration, the greater the likelihood that the fault signal 252 was triggered by touchdown rather than an accumulation of spurious contacts and/or noise over time. This is because touchdown causes the count value to increase faster, and therefore trigger the fault signal faster. In this embodiment, the controller 10 may determine whether there is touchdown by comparing the time duration to a time threshold. If the time duration is equal to or below the time threshold, then the controller 10 may determine that there is touchdown. If the time duration is above the time threshold, then the controller 10 may determine there is no touchdown. Alternatively, if the time duration is above the time threshold, then the controller 10 may use the method in FIG. 8 to determine whether there is touchdown. This allows the controller 10 to detect a touchdown event that may have occurred a long time duration since the last counter reset.

The time threshold may be determined, for example, experimentally by measuring the time it takes the accumulation of spurious contacts to trigger the fault signal in one or more trials, and setting the time threshold below the measured time. The time threshold may also be determined by adjusting the time threshold until a number of false touchdown alarms is reduced below a certain level. Other methods may also be used to set the time threshold.

In one embodiment, the touchdown circuit 205 may be integrated in the preamplifier circuit 32 of the disk drive 100. To facilitate integration of the touchdown circuit 205 in the preamplifier circuit 32, the touchdown circuits 205 may include any one or more of the following advantages.

One advantage is that the touchdown circuit 205 does not require a clock or a large integration capacitor to measure a time duration. This is because the controller 10 can measure the time duration between the fault signal 252 and the count value read from the counter 235. By not requiring a clock, the touchdown circuit 205 avoids the generation of a clock signal in the preamplifier circuit 32, which may feed into other signals in the preamplifier circuit 32 and interfere with the operation of the preamplifier circuit 32.

Another advantage is that the touchdown circuit 205 may send the fault signal 252 to the controller 10 through the same fault pin used by the preamplifier circuit 32 to communicate other fault signals to the controller 10. This is because the controller 10 can read the fault status message from the register 250 to determine the nature of a received fault signal, and therefore distinguish the fault signal 252 from other fault signals sent through the shared fault pin. As a result, the touchdown circuit 205 can be integrated in the preamplifier circuit 32 using an existing interface for communicating fault signals from the preamplifier circuit 32 to the controller 10.

Figure 9:
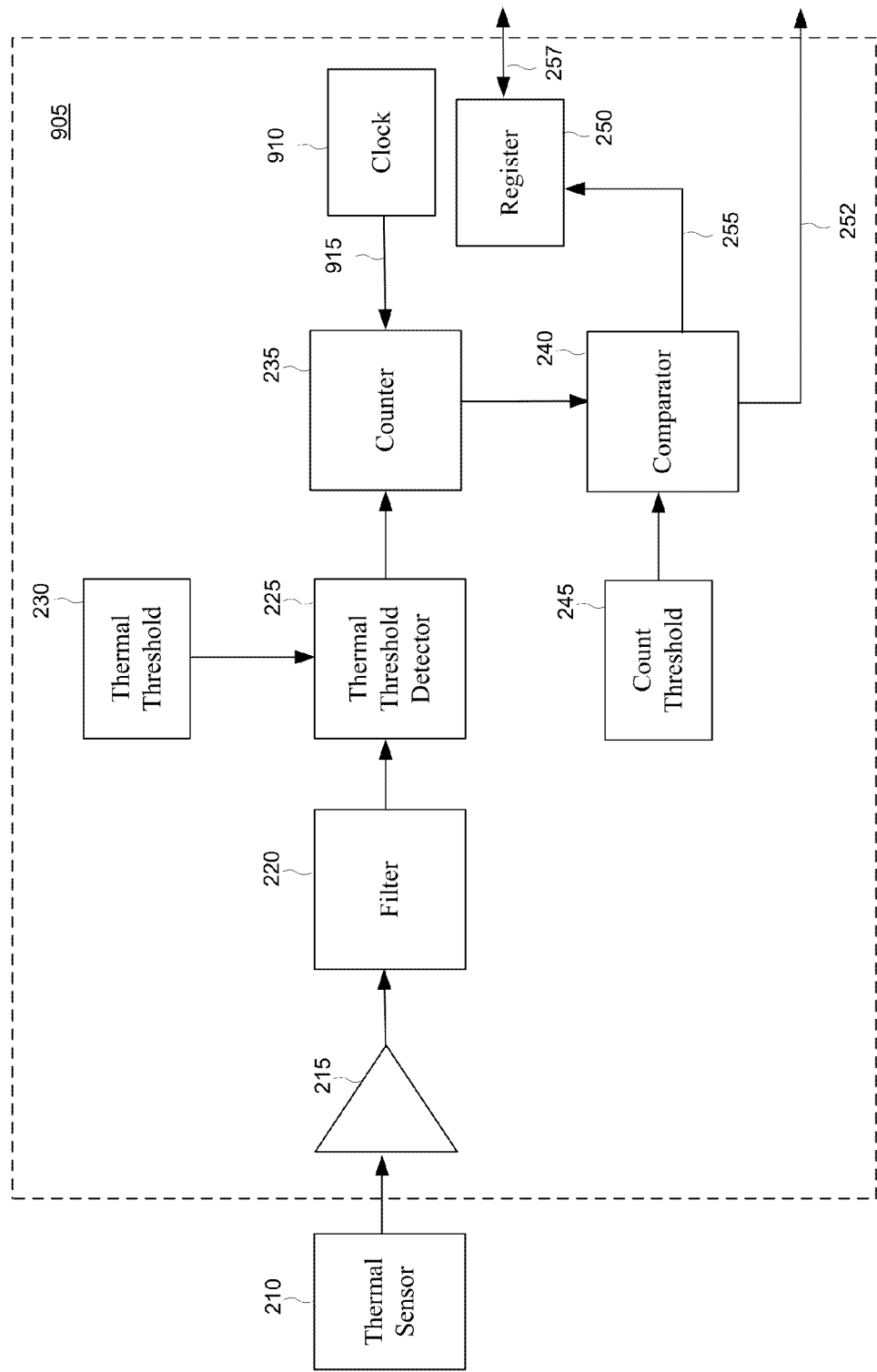
FIG. 9 is a block diagram of a touchdown circuit according to another embodiment of the present invention.

FIG. 9 shows a touchdown circuit 905 according to another embodiment of the present invention. In this embodiment, the touchdown circuit 905 comprises the amplifier 215, the filter 220, the thermal threshold detector 225, the counter 235 and the comparator 240. In addition, the touchdown circuit 905 comprises a clock 910.

In this embodiment, the clock 910 generates a clock signal 915 that periodically resets the counter 235 to prevent the fault signal 252 from being triggered by an accumulation of spurious contacts over time instead of touchdown. In this embodiment, the controller 10 may automatically determine there is touchdown when the controller 10 receives the fault signal 252. To minimize false touchdown alarms, the time period between counter resets by the clock 910 may be set to a time duration that is short enough to prevent the count value from reaching the count threshold 245 due to an accumulation of spurious contacts over time instead of touchdown.

For the embodiment in which the touchdown circuit 905 is integrated in the preamplifier circuit 32, the clock 910 may operate at a lower frequency than the read/write signals 26 to minimize interference in the preamplifier circuit 32.

The control circuit 905 may also receive a clock signal to periodically reset the counter 235 from an external source, in which case the clock 910 may be omitted. For example, the touchdown circuit 905 may receive a servo gate signal, which has a period of one servo wedge, and reset the counter 235 based on the servo gate signal. In this example, the time period between counter resets may be set to an integer multiple of servo wedges. Other periodic signals may also be used to reset the counter 235.

Figure 10:
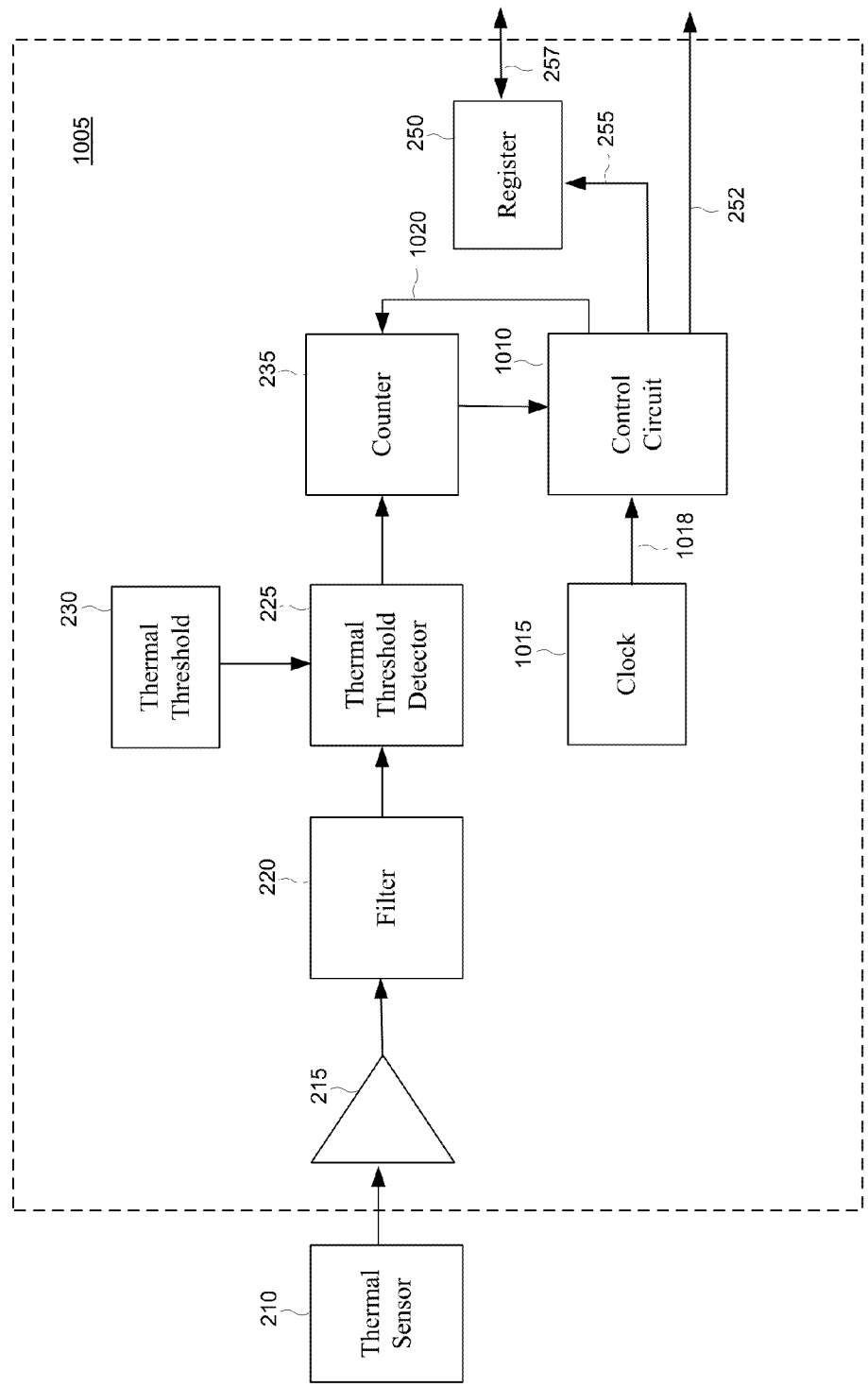
FIG. 10 is a block diagram of a touchdown circuit according to yet another embodiment of the present invention.

FIG. 10 shows a touchdown circuit 1005 according to another embodiment of the present invention. In this embodiment, the touchdown circuit 1005 comprises the amplifier 215, the filter 220, the thermal threshold detector 225 and the counter 235. In addition, the touchdown circuit 1005 comprises a control circuit 1010 and a clock 1015.

The control circuit 1010 receives the count value from the counter 235 and a clock signal 1018 from the clock 1015. The control circuit 1010 is configured to detect touchdown, and to output the fault signal 252 to the controller 10 upon detecting touchdown. In one embodiment, the control circuit 1010 detects touchdown by reading the count value from the counter 235 a time duration after the counter 235 is reset and determining whether the count value is equal to or above a certain threshold. The control circuit 1010 measures the time duration using the clock signal 1018 from the clock 1015. In this embodiment, the control circuit 1010 may determine there is touchdown when the count value after the time duration is equal to or above the threshold, and determine there is no touchdown when the count value after the time duration is below the threshold. After making the determination whether there is touchdown, the control circuit 1010 may reset the counter 235 via reset signal 1020 to restart the process.

The control circuit 1010 may also determine whether there is touchdown by determining a time duration for the count value from the counter 235 to reach a certain amount (e.g., 5 counts), and comparing the time duration with a time threshold. If the time duration is equal to or below the time threshold, then the control circuit 1010 may determine there is touchdown and if the time duration is above the time threshold, then the control circuit 1010 may determine there is no touchdown. The control circuit 1010 measures the time duration using the clock signal 1018 from the clock 1015. After making a determination whether there is touchdown, the control circuit may reset the counter 235 and restart the process.

In this embodiment, the controller 10 may take steps to stop touchdown in response to receiving the fault signal 252. For example, the controller 10 may stop the detected touchdown by increasing the fly height of the head 50. The control circuit 1010 may also send a fault status message to the register 250 indentifying the fault as touchdown.

In this embodiment, the control circuit 1010 may measure the time duration using the clock signal 1018 from the clock 1015. Alternatively, the control circuit 1010 may receive a clock signal from an external source, in which case the clock 1015 may be omitted. The control circuit 1010 may use any periodic signal as a clock signal to measure the time duration, such as the servo gate signal discussed above or other periodic signal.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
   a thermal sensor configured to sense a temperature of a head and to generate a thermal signal based on the sensed temperature; and
   a touchdown circuit configured to receive the thermal signal, to increment a count value each time the thermal signal exceeds a thermal threshold, and to output a fault signal when the count value is equal to or exceeds a count threshold.

2. The disk drive of claim 1, wherein the thermal sensor comprises a thermistor or tunnel magneto resistive (TMR) sensor.

3. The disk drive of claim 1, further comprising a controller configured to receive the fault signal, and to determine whether there is disk touchdown in response to the fault signal.

4. The disk drive of claim 3, wherein the controller is configured to determine whether there is disk touchdown by reading the count value from the touchdown circuit a time duration after receiving the fault signal, and determining whether there is disk touchdown based on the read count value.

5. The disk drive of claim 4, wherein the controller is configured to determine whether there is disk touchdown based on the read count value by determining there is disk touchdown when the read count value is above the count threshold by a certain amount.

6. The disk drive of claim 3, wherein the controller is configured to determine whether there is disk touchdown by measuring a time duration between a time that the count value was reset and a time that the controller received the fault signal, and determining there is disk touchdown when the time duration is below a certain amount.

7. The disk drive of claim 3, wherein the controller is configured to increase a height of the disk head above a disk when the controller determines there is disk touchdown.

8. The disk drive of claim 3, wherein the controller is configured to reset the count value when the controller determines there is no disk touchdown.

9. The disk drive of claim 1, wherein the touchdown circuit comprises:
   a filter configured to filter the thermal signal;
   a thermal threshold detector configured to output a pulse signal each time the filtered thermal signal exceeds the thermal threshold; and
   a counter configured to increment the count value each time the thermal threshold detector outputs the pulse signal.

10. The disk drive of claim 9, wherein the filter is configured to pass the thermal signal within a frequency range corresponding to an air bearing surface resonance.

11. The disk drive of claim 10, wherein the filter has a bandpass within a frequency range of 50 KHz to 2000 KHz.

12. The disk drive of claim 1, wherein the touchdown circuit comprises a control circuit configured to receive a clock signal, to measure a time duration based on the clock signal, to read the count value after the time duration, and to output the fault signal when the read count value is equal to or exceeds the count threshold.

13. The disk drive of claim 12, wherein the touchdown circuit comprises a clock configured to generate the clock signal.

14. A method for detecting touchdown of a head on a disk in a disk drive, comprising:
   sensing a temperature of the head;
   generating a thermal signal based on the sensed temperature;
   incrementing a count value each time the thermal signal exceeds a thermal threshold; and
   generating a fault signal when the count value is equal to or exceeds a count threshold.

15. The method of claim 14, further comprising determining whether there is disk touchdown in response to the fault signal.

16. The method of claim 15, wherein the determining whether there is disk touchdown comprises:
   reading the count value a time duration after the fault signal; and
   determining whether there is disk touchdown based on the read count value.

17. The method of claim 16, wherein the determining whether there is disk touchdown based on the read count value comprises determining there is disk touchdown when the read count value is above the count threshold by a certain amount.

18. The method of claim 15, wherein determining whether there is disk touchdown comprises:
   measuring a time duration between a time that the count value was reset and a time of the fault signal; and
   determining there is disk touchdown when the time duration is below a certain amount.

19. The method of claim 14, further comprising filtering the thermal signal, wherein the incrementing the count value comprises incrementing the count value each time the filtered thermal signal exceeds the thermal threshold.

20. The method of claim 19, wherein the filtering the thermal signal comprises passing the thermal signal within a frequency range corresponding to an air bearing surface resonance.

21. The method of claim 20, wherein the filtering the thermal signal comprises bandpass filtering the thermal signal within a frequency range of 50 KHz to 2000 KHz.

* * * * *